Oct. 13, 1959 F. A. NELSON 2,908,858
DECOUPLING MEANS FOR ELECTRICAL CIRCUITS
Filed Aug. 8, 1952 2 Sheets-Sheet 1
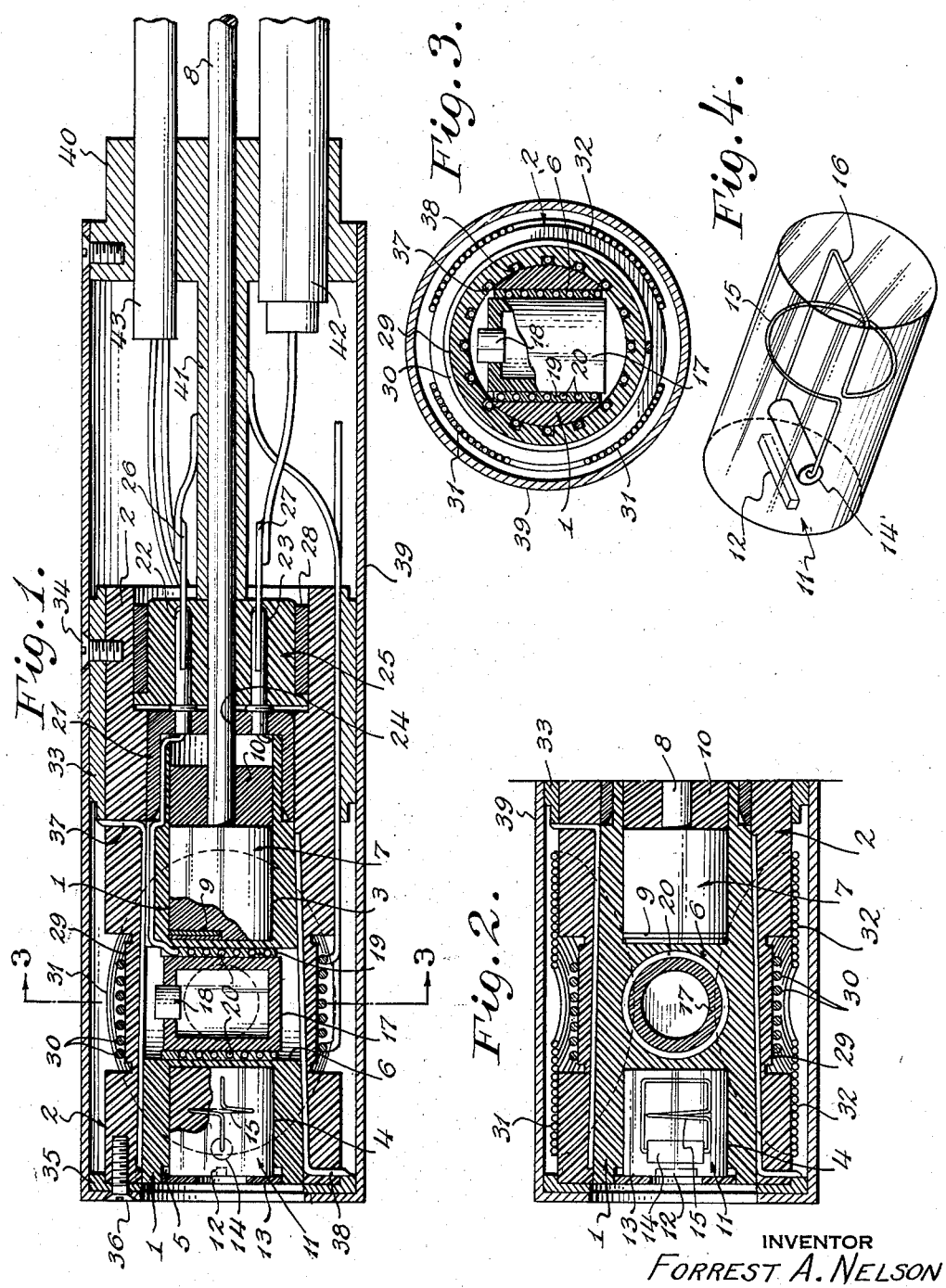
INVENTOR
FORREST A. NELSON
BY
Paul B. Hunter
ATTORNEY

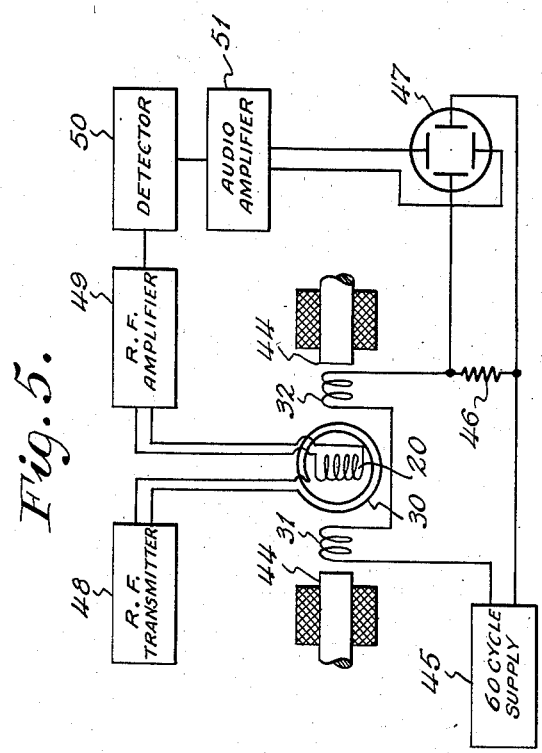

United States Patent Office 2,908,858
Patented Oct. 13, 1959

2,908,858

DECOUPLING MEANS FOR ELECTRICAL CIRCUITS

Forrest A. Nelson, Palo Alto, Calif., assignor to Varian Associates, San Carlos, Calif., a corporation of California Application August 8, 1952, Serial No. 303,353

13 Claims. (Cl. 324—.5)

This invention relates in general to the decoupling of electrical circuits and more particularly to novel means for controlling the out-of-phase component of coupling between two electrically coupled circuits.

This invention is embodied for the purpose of disclosure in apparatus which is utilized in the art of magnetic resonance and for this reason a brief discussion of magnetic resonance will first be given.

The phenomenon of magnetic resonance is explained in U.S. Patent 2,561,489 issued to Felix Bloch and William Hansen on July 24, 1951, entitled "Method and Means for Chemical Analysis by Nuclear Induction." The phenomenon was there described generally with reference to nuclear magnetic resonance but it is well known that this phenomenon applies equally well to electron magnetic resonance as well as magnetic resonance of any similar type gyromagnetic body, i.e., any body which possesses gyroscopic moment and magnetic moment. To maintain the pattern set in the above cited patent, the embodiment of this invention is also nuclear magnetic resonance apparatus but it should be understood that the invention may be embodied in magnetic resonance apparatus of other types and as well in electrical inductively coupled systems in general.

Four important properties of a nucleus are charge, which determines the chemical properties of its associated atom, mass, spin or gyroscopic moment I, and magnetic moment $\mu$. Nucleus with a given charge and mass will also have definite values of spin and magnetic moment, and if the values of the latter two can be determined, then the charge can be determined and thus the atom identified.

If the nucleus is placed in a constant magnetic field $H_0$ which we will take for example to be in the vertical direction, the nucleus, rather than line up with this field, will begin to precess in the field $H_0$ due to its spin and magnetic moment. The angular rate of this precession $\omega_0$, called the Larmor frequency, is proportional to $$\frac{\mu H_0}{I}$$

Due to damping forces, the angle $\theta$ that the axis of the precessing nucleus makes with the vertical field $H_0$ decreases until such time that the nucleus lines up with the field, the elapsed time being called the relaxation time.

If now a magnetic field $H_1$ is placed at right angles to the constant field $H_0$ with orientation which rotates about $H_0$ with uniform angular velocity $\omega$ of radio frequency, as furnished by a transmitter coil at right angles to the field $H_0$, this magnetic field $H_1$ causes the nucleus to again precess about the field $H_0$, this time at the angular rate $\omega$ of the rotating field $H_1$ and in the plane defined by the two fields. The angle $\theta$ that the precessing nucleus makes with the vertical field $H_0$ is determined by the angular velocity $\omega$, the angle being small for all values of $\omega$ less or greater than $\omega_0$. When the angular velocity $\omega$ closely approaches and equals the angular velocity $\omega_0$ of the Larmor frequency, the angle $\theta$ increases rapidly to 90°. A receiver coil placed at a 90° angle to the constant field $H_0$ will have induced in it a voltage due to the nucleus precessing at the Larmor frequency, the action being analogous to a bar magnet being swept past a coil. This induced voltage may be measured and used to indicate that the angular frequency $\omega$ at which the nucleus is precessing is in fact the Larmor frequency $\omega_0$. Knowing this Larmor frequency and the field $H_0$, the ratio of $$\frac{\mu}{I}$$

can be determined and thus the atom identified. It is evident that by using a known atom, an unknown field $H_0$ may be measured by following a similar procedure.

The rotating magnetic field $H_1$ is derived from a sinusoidally alternating magnetic field such as provided by coils 31 and 32 of Fig. 5. Such an alternating field is esuivalent to two magnetic fields of equal strength rotating in opposite directions. The component rotating in the direction of nuclear precession will produce the results described above, whereas the component going in the opposite direction will produce no result since twice in every rotation the direction of the applied torque reverses effecting complete cancellation.

In the above cited patent it was explained that, although effort was made to construct the apparatus embodying the invention therein so that the transmitter coil which supplies the rotating field $H_1$ and the receiver coil were at right angles to each other, it was inevitable that the perpendicularity would not be perfect and as a result some flux from the transmitter coil would link the receiver coil. Usually the leakage flux will be many times the flux cutting the receiver coil due to the precessing nuclei and so the leakage flux could mask the effects due to the precessing nuclei.

A paddle was included in the apparatus of said patent to regulate the amount of leakage flux which would link the receiver coil. Being of a good conductor, such as copper, the paddle had induced in it eddy currents which prevented the flux from penetrating the paddle and in effect directed the flux so as to cause the least possible linkage to the receiver coil. It was found that the limit in flux linkage reduction was in part set by the finite conductivity of the copper of which the paddle was made. As a result of this finite conductivity, the currents induced in the paddle were not quite 180° out of phase with the currents in the transmitter coil. As a result, while fields of the same phase as the currents in the transmitter coil could be reduced to zero, a small field in time quadrature therewith remained. Thus, although the voltage induced in the receiver coil due to the flux linkage was reduced enormously, it was not possible to make it zero. If it was desired to control the leakage so as to obtain any desired magnitude and phase, it was necessary to connect the transmitter and receiver by means of a phase shifter and variable attenuator.

This is one instance of the very general problem which arises when two coils are placed very close together or physically coupled but absolute electrical decoupling is desired and necessary.

One object of this invention is to provide new and novel means for electrically decoupling electrical circuits closely coupled physically.

Another object of this invention is to provide new and novel means for adjusting the out-of-phase component of voltage induced in one electrical circuit by the current flow in a second current-carrying electrical circuit coupled thereto.

Another object of this invention is to provide new and novel means for controlling the phase and magnitude of the voltage induced in one electrical circuit by the current flow in a second current-carrying electrical circuit coupled thereto.

Another object of this invention is to provide a new and novel means for use with a system such as nuclear induction described above for inducing a controlled variable voltage in the receiver coil which may be employed to subtract from or add to the voltage induced in the receiver coil due to flux leakage from the transmitter coil.

Another object of this present invention is to provide a novel improved apparatus for performing chemical analysis of substances without the necessity of destroying the specimen of the substance analyzed.

Further objects of this invention will be evident upon perusal of the following specification, taken in connection with the accompanying drawings of this particular embodiment of the invention in which—

Fig. 1 is a longitudinal sectional view of the probe used in this embodiment of the invention.

Fig. 2 is a longitudinal sectional view of a part of the probe taken at right angles to that of Fig. 1.

Fig. 3 is a transverse sectional view of the probe in a plane indicated by section line 3—3 in Fig. 1, the arrows indicating the direction in which the view is taken.

Fig. 4 is a perspective view of one component of the probe shown in Fig. 1.

Fig. 5 is a schematic drawing showing the electrical apparatus associated with the probe in this embodiment of the invention.

Fig. 6 is a vector diagram of certain voltages induced in the receiver coil.

Figs. 7 and 8 are perspective and plan views, respectively, of an element which may be substituted in the probe of Fig. 1 for the component disclosed in Fig. 4.

Figs. 9 and 10 are perspective and plan views, respectively, of still another type of plug member which may be used in place of the plug disclosed in Fig. 4.

A description of the apparatus of the particular embodiment of the invention disclosed in the drawings will be given first followed by an explanation of its operation. Referring to Figs. 1, 2 and 3, the probe comprises a cylindrical insert form 1 and a cylindrical envelope form 2 into which the insert form 1 is snugly but removably fitted. The insert form 1 is preferably made of plastic or other suitable non-conducting material and tapers slightly toward the end which fits innermost in the envelope form 2, the innermost end being turned down somewhat so as to have a smaller diameter than the main body of the form, this turned down portion being untapered. The innermost end of the insert form 1 contains an axially aligned bore 3 which extends almost halfway into the form 1. The opposite or outermost end of the insert form 1 also has an axially aligned bore 4 therein which extends slightly more than one quarter of the way into the form, a portion 5 of this bore 4 nearest the end of the form 1 being of slightly larger diameter than the main portion thereof. A hole 6 extends through the insert form 1 in that portion of the form between the two bores 3 and 4, the axis of this hole being perpendicular to and intersecting the longitudinal axis of the cylindrical insert form.

Fitted into the bore 3 of the insert form 1 is a cylindrically shaped plastic block or plug 7, the outer end of which is fixedly secured to one end of a long metal shaft 8. The cylindrical plug 7 is snugly fitted into the bore 3 but is easily rotated therein by means of the shaft 8. The end of the plug innermost in the bore has a halfcircle portion cut away and a half-circle or half-disk shaped copper paddle 9 cemented to the plug in the cut away portion. A ringshaped member 10 is cemented to the inner surface of the bore and serves as a bearing for the metal shaft 8 and also prevents endways movement of the plug 7.

Rotatably fitted into the other bore 4 in the insert form is a second cylindrical shaped block or plug 11 made of plastic or other suitable dielectric material. The outer end of the plug 11 has a slit 12 cut therein to allow for rotation of the plug by means of a screwdriver. A plastic sealing ring 13 is cemented to the inside surface of the larger diameter portion of the bore in the insert form, retaining the plug 11 within the bore. The hole in the sealing ring permits passage through of the screwdriver. Completely embedded in the plastic plug 11 is a small resistor 14 of selected resistance value (Fig. 4). One end of a copper conductor is soldered to one end of the resistor 14, the conductor then extending within the plug toward the end innermost in the bore, being formed into a coil 15 of one or more turns in a plane parallel to the end surface of the plug, then extending again toward the innermost end of the plug, diametrically across the end at portion 16 and then extending back toward the resistor and being soldered to the other end of the resistor.

The container in which the known or unknown sample of material is held comprises a hollow cylindrically shaped plastic capsule 17 closed at both ends and having an opening in one end thereof and a plug 18 for the opening. The capsule 17 is adapted to removably fit within a hollow cylindrically shaped plastic receiver coil form 19 in which is embedded a receiver coil 20 of copper wire. The coil form 19 and receiver coil 20 wound therein are so made that they may be slipped as a unit into the hole 6 in the insert form 1 and cemented therein, the axis of the receiver coil being perpendicular to and intersecting the longitudinal axes of the forms 1 and 2. Fitted over the turned down innermost end of the insert form 1 and fixedly cemented thereto is a cup-shaped plastic base 21 having two metal prongs 22 and 23 securely fastened therein and an axially aligned hole 24 therein to allow passage through of the metal shaft 8.

The envelope form 2 of the probe is a plastic form essentially tubular in shape. The axially aligned bore of this envelope form 2 extends completely through the form, a portion of the bore being shaped so as to allow the insert form 1 and its integral base 21 to fit therein and the remainder of the bore having a slightly larger diameter. Fitted into this larger portion of the bore of the envelope form is a plastic two-pin socket 25 adapted to hold the two-pronged base and having two terminals 26 and 27 extending therefrom. The socket has an axially aligned hole therein to permit passage through the same of the metal shaft 8. The socket is fixedly held in place by a ring-shaped locking sleeve 28 which is cemented to the envelope form and the socket.

The major portion of the envelope form 2 has a constant outside diameter but there is a portion 29 of the form which is turned down to a smaller diameter, this latter portion forming a band which is wide enough and so positioned along the envelope form 2 that, when the insert form 1 is fitted completely into the envelope form 2, the band coincides with and completely encircles the receiver coil 20, coil form 19 and sample capsule 17. A transmitter coil 30 of copper wire is wound around the envelope form 2 on the surface thereof within this turned-down portion or band, the axis of the transmitter coil 30 coinciding with the axis of the envelope form. A first sweep coil 31 of copper wire is spirally wound on the curved outer surface of the envelope form, the axis of this coil being perpendicular to and passing through the axes of the transmitter coil 30 and the receiver coil 20. Diametrically opposite the first sweep coil 31 is a second sweep coil 32 spirally wound on the outer surface of the envelope form 2, the axis of this second sweep coil 32 coinciding with the axis of the first sweep coil 31.

A ring-shaped conducting sleeve 33, as of copper, encircles one end of the envelope form 2 and is secured thereto by means of screws 34. Another ring-shaped conducting sleeve 35 is associated with the opposite end of the envelope form 2 and is secured thereto by screws 36. A first plurality of spaced-apart copper wires 37 are soldered at one end thereof to the first copper sleeve 33, the wires first extending radially inward and then axially over the main portion of the envelope form through slots in the bore surface of the envelope form, the wires having their opposite ends free. A second plurality of spaced-apart copper wires 38 are soldered at one end thereof to the second copper sleeve 35, the wires first extending radially inward and then axially over the main portion of the envelope form through slots in the bore of the envelope form with their opposite ends free. The sets of wires are equal in number and alternately spaced around the inside of the envelope form, as shown in Fig. 3. The two copper sleeves 33 and 35 and the associated wires 37 and 38 are component parts of a well known type of electrostatic shield.

Surrounding the entire envelope form 2 is a cylindrical shell of brass 39 which serves as a shield. One end of this shell 39 is partially closed, there being an opening therein to allow the insert form 1 to pass through. The envelope form 2 and copper sleeve 35 are securely fastened to the shell 39 by means of screws such as 36. Closing the other end of the shell 39 and forming a part of the shield is a brass plug 40 which includes a tube 41 which provides a bearing surface for the metal shaft 8. The plug 40 is secured to the shell 39 by screws and contains openings therein to permit passage of two coaxial cables (one cable 42 being shown in the drawings) and one two-conductor cord 43.

The two ends of the receiver coil 20 are soldered to the two prongs 22 and 23, respectively, in the base 21, and the associated terminals 26 and 27 in the socket 25 are connected to the shield and to an outgoing lead in one of the coaxial cables 42, respectively. The two ends of the transmitter coil 30 are connected, respectively, to the shield and to the outgoing lead in the other coaxial cable (not shown). The sweep coils 31 and 32 are connected in series and the other ends are connected, respectively, to outgoing leads in the two-conductor cord 43.

Operation of this apparatus will now be explained. In Fig. 5 is shown the poles 44 of an iron core magnet producing the magnetic field $H_0$ and between them is inserted the probe shown in Figs. 1 to 4. This field $H_0$ is varied by a 60 cycle sinusoidal current passing from source 45 through sweep coils 31 and 32 and resistor 46. In this manner $H_0$ and so the Larmor frequency $\omega_0$ is varied relative to a fixed driving or transmitter frequency $\omega$. The result will be the same as if $H_0$ were held constant and the driving frequency $\omega$ varied as was the case when the phenomenon was explained above. Voltage across the resistor 46 is applied to the horizontal deflection plates of cathode ray tube 47. The horizontal deflection of the cathode ray beam is thus proportional to the deviation of $H_0$ or $\omega_0$ from the mean value determined by the steady field due to poles 44. Radio frequency power of angular frequency $\omega$ is supplied by a transmitter 48 to the transmitter coil 30. The voltage induced in the receiver coil 20 by the precessing nuclei in the sample is amplified in amplifier 49 which increases its magnitude sufficiently to operate detector 50, the output of which is proportional to the magnitude of the R.F. voltage supplied by the amplifier 49. This voltage quickly rises to a maximum when $\omega_0$ is equal to $\omega$ and decreases at other frequencies. These variations are amplified by audio amplifier 51 and finally govern the vertical deflection of the beam of the cathode ray tube. Thus, when the nuclei are precessing at the Larmor frequency $\omega_0$, an indication is given on the screen by a sharp pip.

As previously stated, it is impossible to construct and place the receiver coil 20 and transmitter coil 30 so that flux from the latter does not link the former. In the above cited patent, a paddle such as 9 was employed to direct the flux but, as explained, a small field in time quadrature remained and it was not possible to make the flux linkage zero by use of the paddle alone. By the addition of the resistor 14 and conductor 15 in rotatable plug 11, it is now possible to accurately control the voltage induced in the receiver coil by the flux linkage or other means so that its magnitude and phase may be accurately controlled and reduced to zero if desired.

Referring to Fig. 6, there is shown therein a vector diagram of the voltages induced in the receiver coil 20 but excluding the voltages induced therein by the precessing nuclei. The vector $E_1$ in the vertical direction represents in the main part the voltage induced in receiver coil 20 by the leakage flux from the transmitter coil 30. The component of voltages in this vertical direction shall be termed the in-phase component of the induced voltages, that is, in phase with the time rate of change of the R.F. field produced by the alternating current in the transmitter coil, while the component of voltages in the horizontal direction shall be termed the out-of-phase or quadrature component of the induced voltages. This voltage $E_1$ is 90° out-of-phase with the current in the transmitter coil 30. The vector $E_2$ represents a small voltage in time quadrature with the voltage $E_1$, this voltage being induced by various circumstances such as for instance the eddy current flow in the paddle, as pointed out in the above cited patent. The actual voltage induced in the receiver coil due to current flow in the transmitter coil is the vector sum $E_6$ of these two components.

Now as previously stated, by orientation of the paddle 9, the so-called in-phase component $E_1$ of voltage $E_6$ can be regulated and decreased to zero if desired but the out-of-phase component $E_2$ would remain. The paddle is in effect a loop made up predominantly of reactance in which a voltage is induced from the transmitter coil and which in turn induces a voltage in the receiver coil which is in-phase with $E_1$, the paddle being rotatable to permit variation of the magnitude and sign of the in-phase component.

There is also a voltage induced in the receiver coil 20 due to a current in the resistor-loop (14, 15 and 16) caused by the voltage induced therein by the current in the transmitter coil 30. The current in the transmitter coil 30 causes a voltage to be induced in the loop 15 which is 90° out-of-phase with the current in coil 30 and which is in time phase with $E_1$. The resistor-loop is made up predominantly of resistance but has a very small inductance therein and the current in this resistor-loop circuit lags the voltage by a very small angle. The angle shown in Fig. 6 is drawn much larger than it actually is for the sake of clear description. This angle may be decreased by increasing the resistance-to-inductance ratio of the resistor-loop. The current in the end section 16, which may be thought of as a loop normal to loop 15, of the resistor-loop induces a voltage $E_3$ in the receiver coil which is 90° out-of-phase with the current in the resistor loop and which is, therefore, only slightly out of phase with the voltage $E_2$ in the receiver coil 20.

The magnitude and sign of the voltage $E_3$ induced in the receiver coil 20 due to the current flow in the end section 16 of the resistor-loop is determined by the rotational position of the end section 16 with respect to the receiver coil. The magnitude will be at a maximum when the end conductor 16 is perpendicular to the axis of the coil 20 as shown in Figs. 1 and 2. As the plug 11 is rotated from the position shown in these figures, the flux linkage decreases and thus the magnitude of the resultant induced voltage decreases until, when the plug has been rotated 90° from the position shown in Figs. 1 and 2 and the end section 16 is parallel to the axis of the receiver coil 20, the magnitude of the voltage induced in the receiver coil by the current flowing in the resistor-loop has been reduced to zero. If the rotation of the plug 11 is continued from the position 90° with respect to Figs. 1 and 2 to a position 180° from the position shown in the figures, the magnitude of the voltage induced in the receiver coil 20 due to the current in the resistor-loop will increase from zero to a maximum and this voltage will be 180° out-of-phase with the voltage induced in the receiver coil 20 when the plug 11 was being rotated from the position shown in Figs. 1 and 2 to the position 90° therefrom. Thus it can be seen that the voltage induced in the receiver coil 20 due to the current in the resistor-loop can be represented by points along the dotted line vector $E_7$ or the solid line vector $E_3$, the exact magnitude and direction being determined by the position to which the plug 11 is rotated.

By referring to the vector diagram in Fig. 6, it can be seen that the out-of-phase component $E_2$ of voltage $E_6$ can be cancelled out by a component $E_4$ of the dotted line vector $E_8$, voltage $E_8$ being obtained by the rotation of the resistor-loop to a proper position. By orientation of the paddle 9, the in-phase component of voltage represented by $E_1$ and also the remaining in-phase voltage represented by the component $E_5$ of the dotted line vector $E_3$ may be reduced to zero in the manner similar to that described in the above cited patent.

Figs. 7 and 8 show a plastic plug 52 and closed coil of resistance wire 53 embedded therein which may be used in place of the plug 11 and resistor-loop 14, 15 and 16 in the probe. The right end of the plug 52 in the Figs. 7 and 8 would be placed innermost in the bore 4 in the insert form 1. A voltage induced in the coil 53 by the current in the transmitter coil 30 will in turn induce a voltage in the receiver coil 20, the magnitude and phase of which will be dependent on the position to which the plug 52 is turned with respect to the transmitter and receiver coils and which may be used to control the out-of-phase component of the voltage induced in the receiver coil 20 from the transmitter coil.

A mass of resistive material, made up predominantly of resistance, has been used in a manner similar to the resistor-loop. Referring to Figs. 9 and 10, the resistive material 54 is secured to the inside end surface of the plug. The material is oriented in such a position that current circulating therein due to the transmitter flux induces a voltage in the receiver coil to control the out-of-phase component of the voltage induced therein by the current in transmitter coil. The time phase of this voltage depends upon the ratio of resistance to inductance of all the current paths in this material. An example of such a material is carbon.

Since this invention may be evidenced in many different embodiments, the particular embodiments shown and explained herein are merely illustrative and are not to be interpreted as limiting the invention claimed in the following claims.

What is claimed is:

1. A probe circuit for use in producing and indicating gyromagnetic resonance in samples of matter comprising a first circuit carrying a varying current and inductively coupled to said sample for producing said resonance, a second circuit inductively coupled to said sample and having a voltage induced therein due to said resonance and also inductively coupled to said first circuit and having a voltage induced therein due to said current in said first circuit, a third circuit inductively coupled to said first circuit having a voltage induced therein due to said current in the first circuit, a fourth circuit inductively coupled to said second circuit, said third and fourth circuits being electromagnetically coupled together so as to produce a varying current in said fourth circuit due to said voltage induced in said third circuit, said varying current in said fourth circuit inducing a further voltage in said second circuit.

2. In combination, means for precessing a gyromagnetic body in a unidirectional magnetic field including a transmitter coil for producing an alternating field substantially at right angles to said unidirectional field, energy translating means adjacent to the intersection of said unidirectional and alternating fields energized by the field at right angles to said unidirectional and alternating fields including a receiver coil at right angles to said transmitter coil, a third coil inductively coupled to said first coil, a fourth coil inductively coupled to said second coil, and a circuit including a resistor for serially connecting said third and fourth coils.

3. In combination, means for precessing a gyromagnetic body in a unidirectional magnetic field including a transmitter coil for producing an alternating field substantially at right angles to said unidirectional field, energy translating means adjacent to the intersection of said unidirectional and alternating fields energized by the field at right angles to said unidirectional and alternating fields including a receiver coil at right angles to said transmitter coil, a third coil in parallel with and inductively coupled to said transmitter coil, a fourth coil in variable inductive relationship with said receiver coil, and circuit means for serially connecting said third and fourth coils.

4. The combination in claim 3 including a resistor connected in series with said third and fourth coils.

5. In combination, a first coil of wire for carrying a varying current, a second coil of wire positioned substantially normal to said first coil of wire having a voltage induced therein due to the current in the first coil, and a mass of material having a high ratio of resistance to reactance inductively coupled to said first coil and inductively coupled to said second coil for controlling the out-of-phase component of the electrical energy induced in said second coil from said first coil.

6. In a gyromagnetic resonance system for producing resonance between the precessions of portions of atoms possessing the properties of magnetic moment and gyroscopic moment in a unidirectional magnetic field and radio frequency energy applied to the portions of atoms substantially normal to the unidirectional magnetic field comprising a transmitter coil for applying the radio frequency energy to the portions of atoms to thereby cause forced precession of the portions, a receiver coil positioned substantially normal to the transmitter coil for picking up the energy produced by the precessing atom portions, and a mass of material having a high ratio of resistance to reactance inductively coupled to said transmitter coil and inductively coupled to said receiver coil.

7. Gyromagnetic resonance apparatus comprising means for producing a unidirectional magnetic field for causing gyromagnetic portions of atoms to orient themselves with their magnetic poles in a first direction, radio frequency transmitter means for applying a radio frequency magnetic field to said portions to cause said portions to precess about said first direction, radio frequency induction means energized by the precessing portions, and electrical conducting means having a high ratio of resistance to reactance inductively coupled to the transmitter means and said induction means for controlling a component of the energy induced in the induction means due to the radio frequency energy in the transmitter means.

8. Apparatus for identifying constituent atoms of substances comprising means for varying the precession angle of polarized gyromagnetic portions of atoms, and means for indicating said precession angle, said means for varying said precession angle including a coil for generating an alternating magnetic field, said indicating means including a coil substantially at right angles thereto, and electrical conducting means having a high ratio of resistance to reactance inductively coupled to said two coils for controlling a component of the energy induced in the second coil due to the alternating magnetic field generated by the first coil.

9. Gyromagnetic resonance apparatus comprising means for producing a unidirectional magnetic field for causing gyromagnetic portions of atoms to orient themselves with their magnetic poles in a first direction, radio frequency transmitter means for applying a radio frequency magnetic field to said portions to cause said portions to precess about said first direction, radio frequency induction means energized by the precessing portions, and a conductor loop having a high ratio of resistance to reactance inductively coupled to the transmitter means and said induction means for controlling a component of the energy induced in the induction means due to the radio frequency energy in the transmitter means.

10. Gyromagnetic resonance apparatus comprising means for producing a unidirectional magnetic field for causing gyromagnetic portions of atoms to orient themselves with their magnetic poles in a first direction, radio frequency transmitter means for applying a radio frequency magnetic field to said portions to cause said portions to precess about said first direction, radio frequency induction means energized by the precessing portions, and means inductively coupled to the transmitter means and said induction means for controlling the out-of-phase component of the energy induced in the induction means due to the radio frequency energy in the transmitter means.

11. Apparatus for identifying constituent atoms of substances comprising means for varying the precession angle of polarized gyromagnetic portions of atoms, and means for indicating said precession angle, said means for varying said precession angle including a coil for generating an alternating magnetic field, said indicating means including a coil substantially at right angles to said first coil, and means inductively coupled to said two coils for controlling the out-of-phase component of the energy induced in the second coil due to the alternating magnetic field generated by the first coil.

12. In combination, matter comprising gyromagnetic bodies adapted to be positioned in a polarizing magnetic field, a transmitter coil positioned near the matter, a radio frequency transmitter coupled to the transmitter coil for supplying radio frequency energy thereto, the transmitter coil providing an alternating field enveloping the matter substantially perpendicular to the polarizing field, the alternating field causing the gyromagnetic bodies to precess in the polarizing field at the transmitted radio frequency, a receiver coil positioned near the matter substantially perpendicular to the transmitter coil, the receiver coil having energy induced therein by the fields set up by the precessing gyromagnetic bodies, and circuit means inductively coupled to the transmitter coil and the receiver coil having a voltage induced therein due to the radio frequency energy in the transmitter coil and in turn inducing a voltage in the receiver coil to thereby control the out-of-phase component of the voltage induced in the receiver coil due to the radio frequency energy in the transmitter coil.

13. In combination, matter comprising gyromagnetic bodies adapted to be positioned in a polarizing magnetic field, a transmitter coil positioned near the matter, a radio frequency transmitter coupled to the transmitter coil for supplying radio frequency energy thereto, the transmitter coil providing an alternating field enveloping the matter substantially perpendicular to the polarizing field, the alternating field causing the gyromagnetic bodies to precess in the polarizing field at the transmitted radio frequency, a receiver coil positioned near the matter substantially perpendicular to the transmitter coil, the receiver coil having energy induced therein by the fields set up by the precessing gyromagnetic bodies, a receiver circuit coupled to the receiver coil for amplifying the signals induced in the coil, indicator means coupled to the receiver for displaying the signals, and circuit means inductively coupled to the transmitter coil and the receiver coil having a voltage induced therein due to the radio frequency energy in the transmitter coil and in turn inducing a voltage in the receiver coil to thereby control the out-of-phase component of the voltage induced in the receiver coil due to the radio frequency energy in the transmitter coil.

References Cited in the file of this patent

UNITED STATES PATENTS

| | | |
|---|---|---|
| 1,968,346 | Neiss | July 31, 1934 |
| 2,321,355 | Berman | June 8, 1943 |
| 2,437,455 | Berman | Mar. 9, 1948 |
| 2,479,656 | Wiegand | Aug. 23, 1949 |
| 2,561,489 | Bloch et al. | July 24, 1951 |
| 2,598,252 | Gossick | May 27, 1952 |
| 2,608,621 | Peterson | Aug. 26, 1952 |